United States Patent [19]

Sturm

[11] 4,393,571
[45] Jul. 19, 1983

[54] APPARATUS FOR PRODUCING AN ARC WELDED SLEEVE

[76] Inventor: Werner Sturm, Allerheiligenstr. 624, Hägendorf, Switzerland

[21] Appl. No.: 192,526

[22] PCT Filed: May 29, 1979

[86] PCT No.: PCT/CH79/00079

§ 371 Date: Jan. 29, 1980

§ 102(e) Date: Jan. 10, 1980

[87] PCT Pub. No.: WO79/01140

PCT Pub. Date: Dec. 27, 1979

[30] Foreign Application Priority Data

May 29, 1978 [CH] Switzerland .......................... 5858/78

[51] Int. Cl.³ ............................................. B23P 22/00
[52] U.S. Cl. ..................................... 29/564.6; 29/611; 29/618; 242/7.05 B
[58] Field of Search ................. 29/611, 598, 611, 618, 29/564.6, 564.1; 242/7.05 B, 7.05 R, 7.05 C

[56] References Cited

U.S. PATENT DOCUMENTS 3,927,456 12/1975 Dammer .......................... 242/7.05 B
3,927,843 12/1975 Dammer .......................... 242/7.05 B Primary Examiner—Leon Gilden
Attorney, Agent, or Firm—Roylance, Abrams, Berdo & Farley

[57] ABSTRACT

A first and a second clamp member 25, 35 are shaped onto a coil former 1 to be provided with a coil and together with first and second clamping bodies 26, 36 permit the clamping and holding of the wire 10 during the winding and/or separation of the wire. For separating the wire 10 a separating apparatus 45 having a separating mandrel 46 and a separating sleeve 47 is placed on the coil former 1, so that the separating sleeve is moved relative to the separating mandrel and as a result the wire is separated. The winding apparatus can form a station C of an injection moulding machine on which it is possible to produce arc welded sleeves 4 made from thermoplastic material.

7 Claims, 3 Drawing Figures

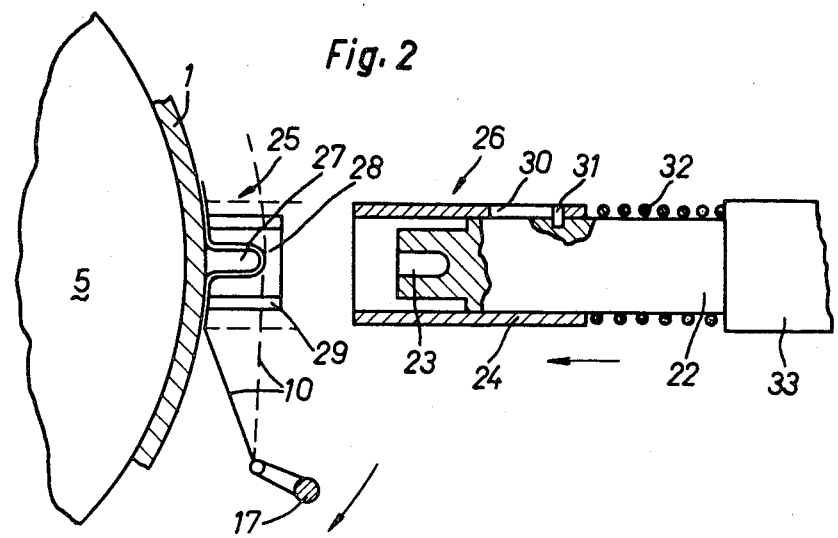
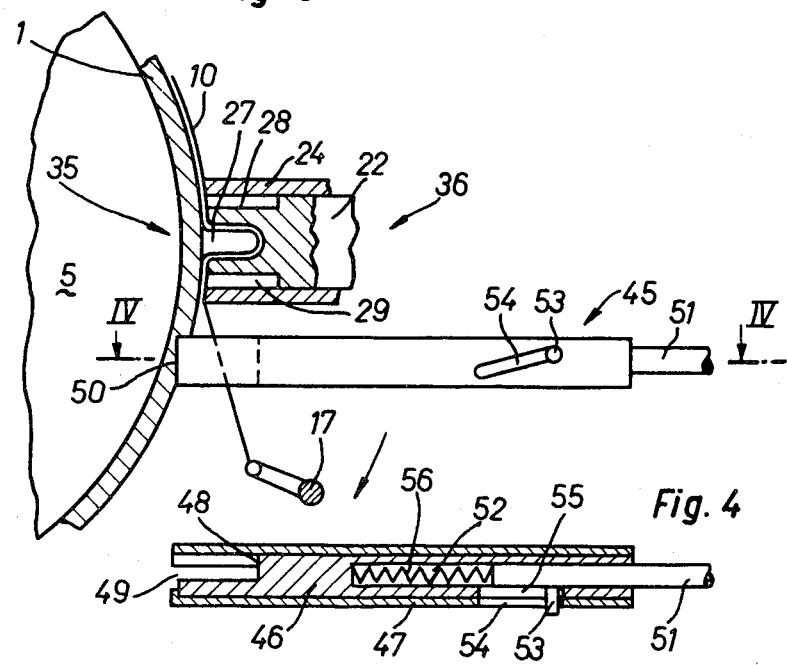

APPARATUS FOR PRODUCING AN ARC WELDED SLEEVE

The invention relates to the manufacture of a welding sleeve with an electrical heating conductor in the form of a coil made from an electrical resistance heating wire wound in spaced, juxtaposed turns and embedded in the inner wall of a thermoplastic sleeve member, the turns of the coil being wound on a coil former after which the coil is embedded in the sleeve member.

BACKGROUND OF THE INVENTION

Various constructions of welding sleeves made from a thermoplastic material are known in which the ends of the thermoplastic line elements, i.e. pipe sections, shaped members, terminations and other fittings are interconnected. It is common to all these constructions that the adjacent surfaces of the line elements and the welded sleeve are in part melted and joined with the aid of a heating conductor in which electrical heat is produced.

The production of electrical welding sleeves is relatively complicated, because it is largely dependent thereon whether a satisfactory connection of the ends of the line elements is obtained or not. Welding sleeves in which a coil of an electrical resistance heating wire is arranged in the vicinity of the inner wall of a sleeve member has proved very satisfactory. However, it must be ensured that on the one hand an interturn short-circuit of the resistance heating wire is reliably avoided, a layer of turns in the immediate vicinity of the inner wall is ensured and that on the other hand a reliable connection with the contact points for connecting the electrical welding sleeve to a supply unit is obtained. Although it is possible to fulfil these requirements, manufacture partly takes place by manual operations.

BRIEF DESCRIPTION OF THE INVENTION

An object of the present invention is to so develop a method of the type described hereinbefore that it is possible to completely automatically and rapidly manufacture an electrical welding sleeve, whilst adhering to the above-mentioned quality requirements. The coil must be coilable without waste, i.e. without waste wire pieces being formed.

According to the invention a technique is provided wherein the wire is clamped and held at a first clamping point provided on the coil former, is wound onto the latter by means of a wire guide and after winding is clamped and held at a second clamping point arranged on the coil former, after which the wire is moved up to a cutting station provided on the coil former where it is cut by cutting means. The invention also relates to an apparatus suitable for performing the method according to the invention wherein on both ends of a coil former are provided a first and a second clamp member, so that, following the passage of a wire guide arm which is movable with respect to the coil former onto said first clamp member, is moved a first clamping body arranged on a first support movable with respect to the coil former and onto said second clamp member can be moved a second clamping body arranged on a second support movable with respect to the coil former, following the winding of the coil, whilst a separating apparatus having a separating mandrel and a separating sleeve and which is operable by placing on the coil former is fixed to a third movable support.

Finally the invention also covers the use of the apparatus according to the invention in a multi-station injection moulding machine as a station between a station for producing a coil former and a station for the injection moulding of the coil former provided with the coil.

An embodiment of the apparatus according to the invention is shown in the drawings and is described hereinafter with respect to the drawings, wherein FIG. 1 is a side view of a multi-station injection moulding machine with the apparatus according to the invention;

FIG. 2 is an enlarged top plan view of the portion of FIG. 1 enclosed in rectangle II, in partial section;

FIG. 3 is an enlarged top plan view of the portion of FIG. 1 enclosed in rectangle III, in partial section; and FIG. 4 is a section along the line IV—IV of FIG. 3.

Figure 1:
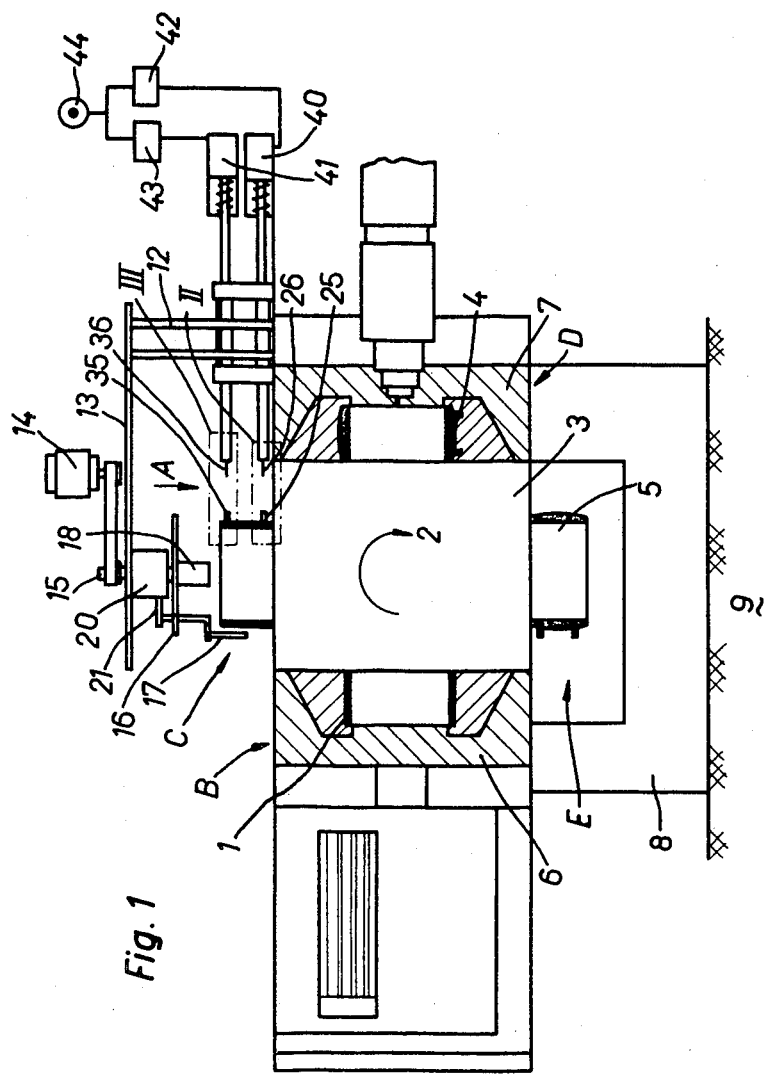

The invention is based on the consideration that the winding of a cylindrical body with an electrical resistance heating wire wound in the manner of spaced turns can be performed completely automatically with relatively small expenditure on equipment and whilst avoiding wire waste occurring between two winding processes if the body to be wound is utilised for performing the individual winding operations, particularly for guiding and holding the wire at the start and finish of the coil.

This is illustrated by means of the injection moulding machine shown in FIG. 1 and the details shown in the other drawings. The machine according to FIG. 1 has four stations B, C, D and E and is used for the manufacture of a welding sleeve of a thermoplastic material, e.g. according to DAS No. 24 10 039 or U.S. Pat. No. 3,943,334. This sleeve comprises an inner member wound with a heating conductor and an outer sleeve member. In station B the inner member called coil former 1 is injection moulded. Four mandrels 5 corresponding to the four stations B to E are arranged on a mandrel support 3 rotatable in the direction of arrow 2. For making the coil former 1 a multi-part injection moulding mould 6 is moved over the mandrel 5 and the resulting cavity for the coil former 1 is filled with thermoplastic material in a not shown manner. The mould 6 is moved away and opened, after which coil former 1 is rotated to station C in which a coil comprising a resistance heating wire is applied to the coil former 1. At the end of the winding operation the coil former 1 is rotated to station D, where the outer body is injection moulded around the coil former 1 by means of a further injection mould 7. After removing mould 7 the now complete arc welded sleeve 4 is rotated to station E, where the sleeve 4 is checked, after which it is ejected from mandrel 5 and moved away.

The injection moulding machine is mounted on a machine bed 8, which in turn stands on a bedplate 9. The construction of the injection moulding machine is not described in detail, because it is not important for the invention.

The winding operation in station C will now be described in greater detail. Over station C a column 12 is fixed to the machine frame, column 12 supporting an arm 13 which carries a powered drive 14, e.g. an electric or hydraulic motor, which drives a winding shaft 15 by means of a casing drive, e.g. a belt drive. By means of a support 16 a winding arm 17 is axially movable on winding shaft 15 and a wire spool 18 is rotatably mounted on support 16. A form member 20 having not shown helical guide grooves is fixed to arm 13 concentrically to winding shaft 15, said grooves being scanned by a guide sensor connected to the winding arm 17 to determine the axial advance of winding arm 17.

While winding the coil former 1 the winding arm 17 rotates around the fixed coil former 1 and moves from bottom to top in accordance with the construction of the form member 20. At the start of winding the wire is secured to a first clamp member 25 shaped onto the coil former 1 with the aid of a first clamping body 26 which is movable radially with respect to the coil former 1 and during the complete winding process is held in place. At the other end of coil former 1 is located a second clamp member 35 on which the wire is secured and held by means of a second radially movable clamping body 36. The two clamping bodies 26, 36 are operated by extendable drives 40, 41, e.g. pneumatic piston and cylinder assemblies, which are actuated by air under pressure from a compressed air source 44 controlled by means of control valves 42, 43.

The separation of the wire from the finished coil takes place in the vicinity of the second clamp member 35 and this process will be described in greater detail hereinafter.

The portion contained in the dash-dot rectangle II of FIG. 1 is shown in FIG. 2 and is a larger scale view of the mandrel 5 located in station C, together with the coil former 1 and the first clamp member 25 shaped onto coil former 1. The first clamping body 26 cooperates with clamp member 25 for securing and holding the start of the winding wire 10.

At the end of the preceding winding process winding arm 17 with the end of winding wire 10 moves into the position shown in FIG. 2. The end of wire 10 is placed over the first clamp member 25 which has a radially protruding central pin 27 surrounded by a cylindrical socket 28, which has a slot 29 in the circumferential direction. The first clamping body 26 is spaced at an adequate distance for the passage of winding arm 17 and after the passage of the arm 17, clamping body 26 is moved onto clamp member 25 into the position shown in FIG. 3. The first clamping body has a clamping mandrel 22, which is e.g. the extension of the piston rod of the piston and cylinder assembly, the mandrel having a bore 23 which is moved over the pin 27. A movable clamping sleeve 24 having a slot 30 into which projects a pin 31 mounted in clamping mandrel 22 for limiting the stroke of the sleeve is located on the clamping mandrel 22. The clamping sleeve 24 is pressed by means of a compression spring 32 supported on the clamping mandrel into the position shown in FIG. 2.

For securing wire 10, the first clamping body 26 is moved over the first clamp member 25, the wire and body 26 being shown by the dotted lines in this position, in which position the clamping sleeve 24 is moved back approximately to the height of the clamping mandrel 22. For the next turn the winding arm 17 moves directly over the first clamping body 26 and the turns are laid in accordance with the construction of the form member 20.

By moving over the first clamping body 26 the wire is brought into the drawn out form engaging with pin 27 and thus forming a contact pin for a contact sleeve to be slid over it. The function of clamping sleeve 24 is that when retracting the clamping mandrel 22 it presses down the wire 10 until the bore 23 is released from pin 27. This obviates any change in the course of the wire on pin 27 on retracting the clamping mandrel 22.

FIG. 3 shows the second clamp member 35 shaped onto sleeve member 1 and the associated second clamping body 36 in the clamping position. The second clamp member 35 and the second clamping body 36 are identically constructed to the first clamp member 25 and the first clamping body 26. At the end of the winding process winding arm 17 has placed the wire 10 through the slot 29 over pin 27, where it is pressed onto the latter by the clamping mandrel 22. The wire coming from the winding arm 17 must now be separated after the second clamp member 35, so that the winding of the following coil former 1 can take place. The separation of wire 10 is brought about by separating apparatus 45, which is shown in detail in FIG. 4 and comprises a separating mandrel 46 and a separating sleeve 47, which can be rotated relative to one another. At the coil former-side end of separating mandrel 46 is a recess 48, whilst sleeve 47 is slotted and, together with the recess 48, forms a gap 49 in which the wire 10 is received for separating purposes. A recess 50 is provided in coil former 1 into which the separating apparatus is inserted for separating wire 10. A support 51 carrying the separating apparatus 45 is moved further into a bore 52 of separating mandrel 46 and turns the separating sleeve 47 with respect to the separating mandrel 48 with the aid of a pin 53, which projects into a diagonal groove 54 of separating sleeve 47. As a straight slot 55 is provided in separating mandrel 46 the separating sleeve 47 rotates relative to separating mandrel 46 until mandrel recess 48 is angularly offset relative to the sleeve slot closing gap 49 and separating wire 10. A spring 56 in bore 52 brings the separating mandrel 46 and separating sleeve 47 into their rest position.

Support 51 can move together with the second clamp member 36, so that it can be connected to the support thereof, which corresponds to support 33 of the first clamping body 26. However, support 51 can also be operated by a separate lifting drive.

The winding process for coil former 1 takes place in the following manner:

Firstly the end of wire 10 is placed by winding arm 17 into the gap 29 of the first clamp member 25, after which the support 33 moves the first clamping body 26 onto the first clamp member 25 and in this way places wire 10 on pin 27 in closely engaging manner. Winding arm 17 now starts moving again and forms the individual turns from bottom to top in accordance with the guide grooves for the guide sensor 21 provided in form member 20. At the end of the winding process the wire is placed in slot 29 of the second clamp member 35 and the support of the second clamping body 36 is moved and consequently the wire 10 is secured on the second clamp member 35. Simultaneously or immediately thereafter the separating apparatus 45 moves onto the coil former 1 and is supported in recess 50. As support 51 is moved on, the separating sleeve 47 is rotated and consequently wire 10 is separated. The completely wound coil former 1 is now moved into station D, whilst a new winding process starts in station C.

Due to the fact that the coil former 1 is also used for the securing, guidance and separation of wire 10 the moved parts, i.e. clamping bodies 26, 36 and separating apparatus 45 merely have to perform a reciprocating movement. By placing the separating apparatus 45 in recess 50 of coil former 1 the separating process is commenced in a simple manner.

The construction of clamp members 25, 35 and clamping bodies 26, 36 can be modified compared with the embodiments shown in FIGS. 2 and 3. Thus, for example, pin 27 can be replaced by a bush into whose bore is forced wire 10 by a correspondingly constructed clamping mandrel 22. Sleeve 28 with slot 29 can also be omitted if the guidance of wire 10 is realised in some other way. The important point is that a part is shaped onto the coil former 1 which significantly facilitates the clamping to the movable part.

The recess 50 for receiving the separating apparatus 45 can optionally be omitted. However, it is important that the separating apparatus 45 must be placed on the coil former 1 in order to achieve the relative movement between the separating mandrel 46 and the separating sleeve 47.

The wire 10 guided over pin 27 forms a plug contact, with the aid of which the wire wound into a coil can be connected to a power supply.

The above-described apparatus for winding a coil former need not be a station of an injection moulding machine designed for the manufacture of arc welded sleeves, but can also be constructed as a separate machine. It can then be used for winding various coil formers.

The clamp members 25, 35 on coil former 1 can also have a cavity in place of pin 27 into which the wire can be pressed by clamping mandrel 22 by means of a finger instead of bore 23. The cylindrical socket 28 which forms the guide for the wire can also be differently constructed, e.g. as a guide tongue. In certain cases there is no need for the socket 28 or the guide tongue, e.g. if the pin 27 is constructed as a web and bore 23 as a slot.

I claim:

1. An apparatus for forming a welding sleeve of the type having a coil of electrical resistance heating wire in spaced, juxtaposed turns embedded in the inner wall of a thermoplastic sleeve member and surrounding a cylindrical coil former, comprising
    means at opposite ends of the coil former defining first and second clamp members;
    means for winding the coil of wire around the former so that the windings extend from said first clamp member to said second clamp member;
    first and second clamping bodies;
    means for supporting said clamping bodies for movement toward and away from said first and second clamp members, respectively, so that said first clamping body can be moved to engage said first clamp member after the wire has been placed on said first member to attach the wire thereto, and said second clamping body can be moved to engage said second clamp member after the wire has been placed on said second member to attach said wire thereto; and
    means operatively associated with said second clamping body for severing said wire after attachment thereof to said second clamp member.

2. An apparatus according to claim 1 wherein each of said clamping bodies includes
    a clamping mandrel,
    a clamping sleeve partially surrounding said mandrel and slidable relative thereto, and
    a spring urging said sleeve toward the distal end of said mandrel.

3. An apparatus according to claim 1 or 2 wherein said means for severing includes
    a severing mandrel having a recess in the distal end thereof;
    a severing sleeve slidably surrounding said mandrel and having a recess in the distal end thereof;
    guide means interconnecting said sleeve and mandrel for guiding relative longitudinal and rotary movement thereof between a first position in which said recesses are aligned to form a wire-receiving slot and in which one of said sleeve and mandrel is retracted relative to the other, and a second position in which said recesses are out of alignment; and
    spring means for urging said sleeve and mandrel toward said first position.

4. An apparatus according to claim 3 wherein said coil former includes
    means defining a recess near said second clamping member;
    and wherein said means for severing further includes
    means for moving said means for severing into and against said recess to engage said wire and to move said sleeve and mandrel to said second position, thereby severing said wire.

5. An apparatus according to claim 4, wherein said means for moving said means for severing is movable with said means for supporting said second clamp body.

6. An apparatus according to claim 1 which further includes
    a first molding station for producing a coil former;
    means for transporting the mold former from said first molding station to a winding station which includes said means for winding and said clamping bodies; and
    a second molding station for receiving the coil former with a coil wound thereon from said winding station and for molding a sleeve portion thereon.

7. An apparatus according to claim 1 wherein each of said first and second clamp members includes
    a pin and a socket coaxially spaced from and surrounding said pin,
    said socket having means defining a diametrically extending slot to receive said wire.

* * * * *